(12) United States Patent
Doyle et al.

(10) Patent No.: US 11,477,720 B2
(45) Date of Patent: Oct. 18, 2022

(54) TECHNIQUES AND ARCHITECTURES FOR COORDINATED SCANNING IN A MESH CLUSTER WITH BEACON SYNCHRONIZATION

(71) Applicant: Hewlett Packard Enterprise Development LP, Houston, TX (US)

(72) Inventors: Aidan Doyle, Santa Clara, CA (US); Mohd Shahnawaz Siraj, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 315 days.

(21) Appl. No.: 16/562,498

(22) Filed: Sep. 6, 2019

(65) Prior Publication Data

US 2021/0076294 A1    Mar. 11, 2021

(51) Int. Cl.
*H04W 56/00* (2009.01)
*H04W 40/24* (2009.01)
*H04W 84/18* (2009.01)

(52) U.S. Cl.
CPC ....... *H04W 40/244* (2013.01); *H04W 40/246* (2013.01); *H04W 56/004* (2013.01); *H04W 56/007* (2013.01); *H04W 84/18* (2013.01)

(58) Field of Classification Search
CPC ............. H04W 40/244; H04W 40/246; H04W 56/004; H04W 56/007; H04W 84/18; H04W 48/16
See application file for complete search history.

(56) References Cited

U.S. PATENT DOCUMENTS

| | | | |
|---|---|---|---|
| 5,940,765 A | 8/1999 | Haartsen | |
| 7,564,826 B2 | 6/2009 | Sherman et al. | |
| 7,706,822 B2 | 4/2010 | Emeott et al. | |
| 8,184,564 B2 | 5/2012 | Kinder et al. | |
| 8,331,312 B2 | 12/2012 | Hart et al. | |
| 9,204,244 B2 | 12/2015 | Rantala et al. | |
| 9,277,481 B2 | 3/2016 | Laroia et al. | |
| 9,723,581 B2 | 8/2017 | Patil et al. | |
| 2007/0014269 A1* | 1/2007 | Sherman | H04W 48/12 370/338 |
| 2007/0086426 A1* | 4/2007 | Bonta | H04W 48/10 370/350 |
| 2009/0225742 A1* | 9/2009 | Chu | H04W 48/12 370/349 |
| 2009/0268652 A1 | 10/2009 | Kneckt et al. | |

(Continued)

OTHER PUBLICATIONS

Safaonov, A. et al., "Synchronization and Beaconing" in IEEE 802.11s Mesh Networks, Jul. 2008, 7 pages.

*Primary Examiner* — Edan Orgad
*Assistant Examiner* — Malick A Sohrab
(74) *Attorney, Agent, or Firm* — Jaffery Watson Mendonsa & Hamilton

(57) ABSTRACT

Techniques and mechanisms for coordinated scanning in a mesh cluster. An organization of a wireless mesh cluster having at least one mesh portal, at least one mesh point is determined. For each of the at least one mesh points, a beacon offset value corresponding to each mesh point is determined. Off-channel scanning is coordinated for the mesh points utilizing the beacon offset value for the mesh points. During the off-channel scanning the mesh point discontinues transmission on a home channel and scans at least one other channel.

20 Claims, 5 Drawing Sheets

(56) References Cited

U.S. PATENT DOCUMENTS

2017/0272310 A1\* 9/2017 Rengarajan ......... H04L 41/0823
2017/0347387 A1\* 11/2017 Dunsbergen ........ H04L 49/1584
2020/0100144 A1\* 3/2020 Sundaram ............. H04W 76/27

\* cited by examiner

TECHNIQUES AND ARCHITECTURES FOR COORDINATED SCANNING IN A MESH CLUSTER WITH BEACON SYNCHRONIZATION

TECHNICAL FIELD

Embodiments relate to techniques for managing mesh clusters having multiple mesh points to service client wireless devices. More particularly, embodiments relate to techniques for more efficiently managing mesh clusters in which one or more of the mesh points perform off-channel scanning.

BACKGROUND

In a single-radio mesh cluster topology having a mesh portal and multiple downstream mesh points one or more hops from the mesh portal on the same home channel, it is useful for the mesh nodes to periodically collect scanning information from channels other than the home channel. This is typically accomplished by either the mesh portal or mesh points terminating transmission on the home channel used by the mesh cluster and transmitting and/or receiving on another channel (operating "off-channel"). During this time communications within the mesh cluster can be disrupted.

However, if mesh node scanning is uncoordinated, network outages may be experienced. These outages can occur when one or more mesh nodes are off-channel and network traffic experiences a retry or the traffic is dropped. Thus, poor mesh cluster management can result in inferior performance.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
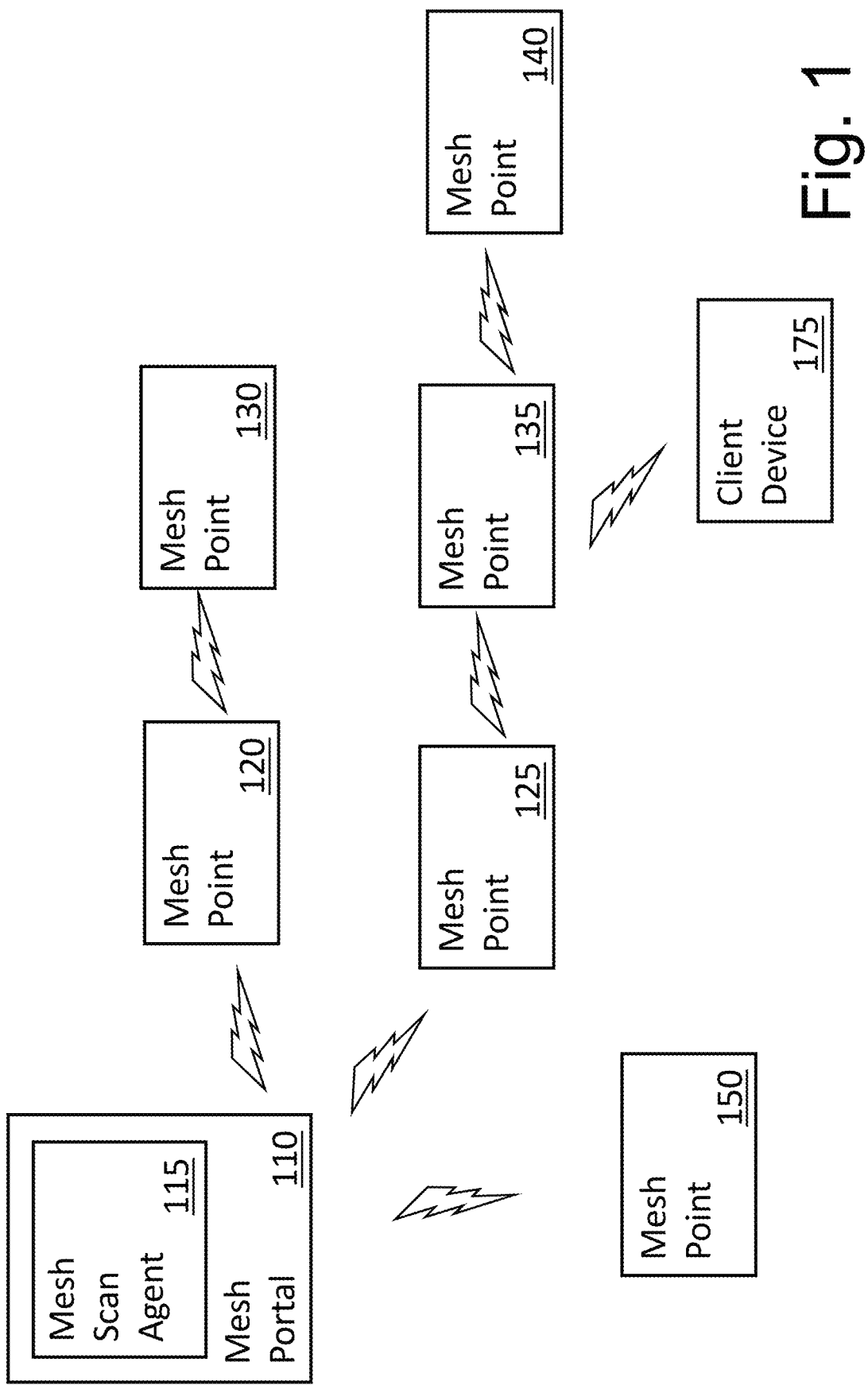
FIG. 1 is a block diagram of one embodiment of a single, simple mesh cluster.

In the following description, numerous specific details are set forth. However, embodiments of the invention may be practiced without these specific details. In other instances, well-known structures and techniques have not been shown in detail in order not to obscure the understanding of this description.

In various embodiments, mesh access points (APs) learn about their environment when they boot up. Mesh APs are either configured as a mesh portal (MPP), which is an AP that uses its wired interface to reach a controller, or configured as a mesh point (MP), which is an AP that establishes an all-wireless path to the MPP. Mesh APs locate and associate with their nearest neighbor that provides the best path to the MPP. Mesh portals and mesh points are also known as mesh nodes, a generic term used to describe APs configured for mesh topologies.

The MPP is the gateway between the wireless mesh network and, for example, an enterprise wired local area network (LAN). In some embodiments, multiple MPPs can be deployed to support redundant mesh paths (mesh links between neighboring mesh points that establish the best path to the mesh portal) from the wireless mesh network to, for example, the LAN. In various embodiments, the MPP broadcasts the configured mesh service set identifier (MSSID/mesh cluster name) and advertises the mesh network service to available mesh points. Neighboring mesh points that have been provisioned with the same MSSID can authenticate to the portal and establish a secure mesh link over which traffic is forwarded. In various embodiments, the authentication process requires secure key negotiation, common to all APs, and the mesh link is established and secured using the appropriate encryption protocols. Mesh portals can also propagate channel information including, for example, CSAs.

In various embodiments, mesh points are APs configured for the mesh point role. In various embodiments, the MPs can provide traditional WLAN services (e.g., client connectivity, intrusion detection, capabilities, user role association, LAN-ot-LAN bridging, QoS support) to client devices and can perform mesh backhaul/network connectivity functionality. In various embodiments, MPs are aware of potential neighbors and can form new mesh links.

A mesh cluster is a logical set of mesh nodes that share a common connection and security parameters required to create mesh links. Mesh clusters can be grouped by and defined by a mesh cluster profile, for example.

As discussed above, in a single-radio mesh cluster topology having a mesh portal and multiple downstream mesh points one or more hops from the mesh portal on the same home channel, it is useful for the mesh nodes to periodically collect scanning information from channels other than the home channel.

If all mesh nodes scan in an uncoordinated manner then the mesh network experiences many outages on different segments, since a mesh-node and all of its descendants lose uplink connectivity whilst that node is off the home-channel. In addition, resources are wasted trying to transmit to unreachable nodes which have not yet returned to the home channel.

Described herein are techniques and strategies to synchronize the scanning events so that the resultant outage is minimized across the whole mesh cluster. If all mesh nodes synchronize beacons at the same time packet collisions would result. Instead, as described in greater detail below, mesh node scanning can be managed to progressively stagger offsets from the mesh portal outwards across the mesh topology to avoid collisions and minimize the overall network outage by performing a synchronized scan across the mesh cluster, where each node uses its assigned offset to burst its beacons before performing a scan.

Figure 3:
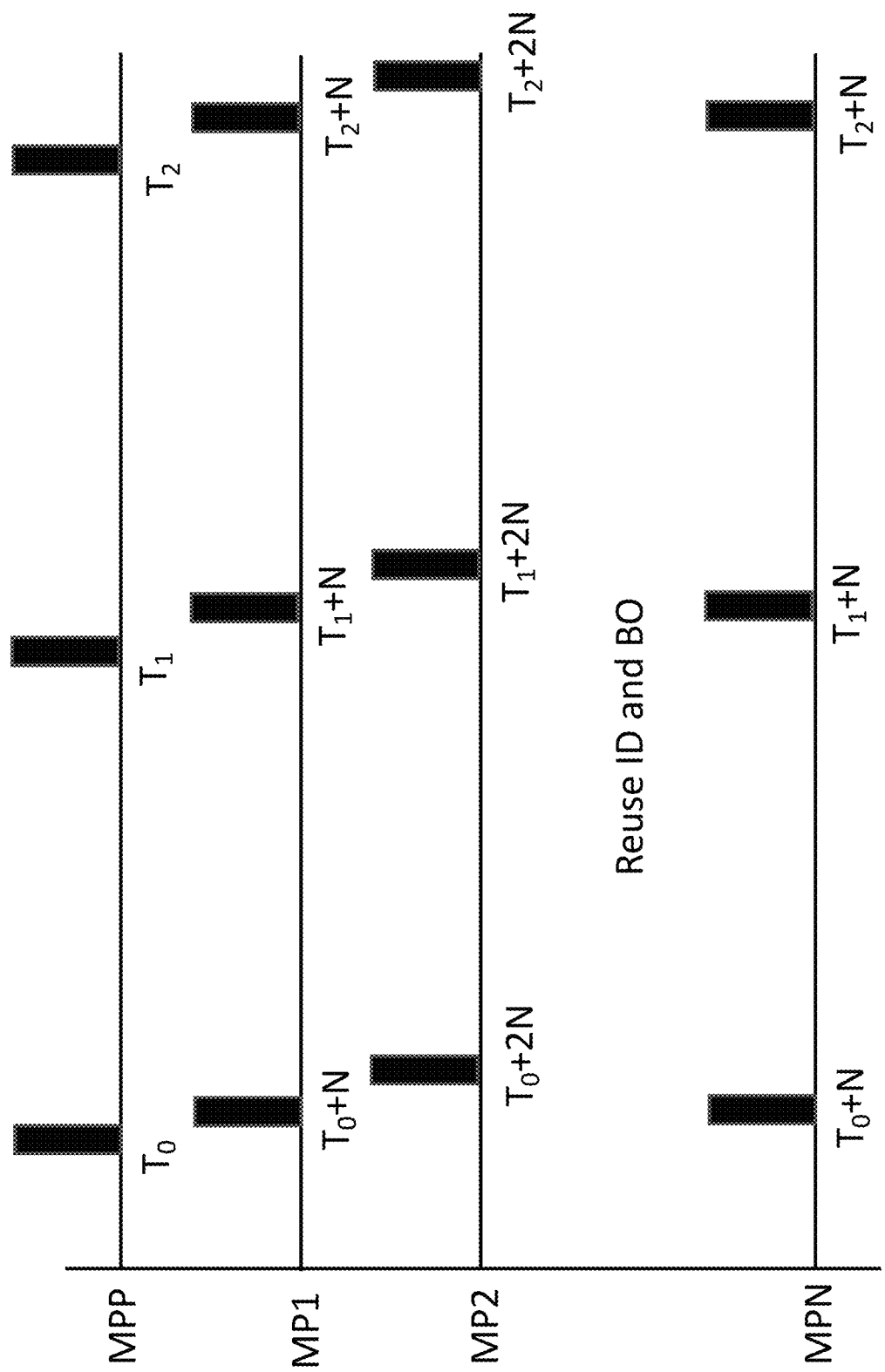
FIG. 3 is an example beacon timing diagram for a mesh cluster.

Conceptually, this synchronized scanning can be considered a ripple of scanning operations that radiate outward from the MPP through the connected MPs according to the number of hops between the MPP and the MP. This is illustrated in FIG. 3, discussed in greater detail below.

In various embodiments, once beacons have been synchronized the mesh portal announces the next scan window by indicating a decrementing scan-count in its beacons which is relayed down the mesh cluster so that all mesh nodes perform their off-channel scan in the same beacon interval. This can be sent as an Information Element (IE) in the beacons, for example. Other techniques can be utilized to coordinate off-channel scanning operations.

FIG. 1 is a block diagram of one embodiment of a single, simple mesh cluster. The example of FIG. 1 includes one mesh portal and six mesh points; however, any number of mesh points can be supported. Further, only one client device is illustrated, but any number of client devices can be supported.

In the example of FIG. 1, mesh portal 110 operates as discussed above to provide an interface for multiple mesh points (e.g., 120, 125, 130, 135, 140, 150) to a larger host network (not illustrated in FIG. 1). Any number of client devices (e.g., 175) can be connected to mesh points within the mesh cluster to gain access to the host network.

In one embodiment, mesh portal 110 includes mesh scan agent 115. In various embodiments described herein, mesh scan agent 115 can function to coordinate off-channel scanning by mesh nodes within the mesh cluster. In various embodiments, mesh scan agent 115 can function to manage node IDs and/or beacon offset values. In alternate embodiments, one or more components (and corresponding functionality) of mesh scan agent 115 can reside outside of mesh portal 110.

In some embodiments, the topology of the mesh cluster is managed in terms of hops from MPP 110. MPs 120, 125 and 150 are one hop from MPP 110. MPs 130 and 135 are two hops from MPP 110, and MP 140 is three hops from MPP 110. More complex mesh topologies can be supported.

As discussed above, mesh nodes periodically scan the environment and can make operational decisions based on the information gathered. However, if all mesh nodes synchronize beacons as the same time, packet collisions will result. As described in greater detail below, techniques can be implemented to progressively stagger offsets from the MPP outwards across the mesh cluster topology to avoid collisions and minimize overall network outage by performing synchronized scans across the mesh cluster. In various embodiments, each mesh node can use its assigned offset to burst its beacons before performing a scan.

In various embodiments, off-channel scanning can ripple out from mesh portal 110. Thus, mesh points (e.g., 120, 125, 150) one hop from mesh portal 110 perform off-channels scanning at the same (or approximately the same) time followed by mesh points (e.g., 130, 135) that are two hops from mesh portal 110. This can continue to radiate outward in a coordinated manner. As described in greater detail below, in some situations, scan intervals may be reused to accomplish all off-channel scanning within the appropriate time frame.

As discussed above, once beacons have been synchronized the MPP can announce the next scan window by indicating a decrementing scan count in its beacons that are relayed through the mesh cluster so that all nodes perform their off-channel scan in the same beacon interval. This can be sent, for example utilizing the IE field in the beacon frames. Other mechanisms for synchronizing off-channel scanning can also be supported As described in greater detail below, a beacon offset (BO) value can be determined for each mesh node. In some embodiments, the MPP can assign a unique offset value to each mesh node in the cluster. In various embodiments, as each mesh node joins the mesh cluster, the node is registered with the MPP, which assigns a unique identifier (I) and the offset can be determined as:

$$BO = I \times N$$

where N is the node burst time. In some embodiments:

$$N = B + D$$

where B is the burst time and D is the burst delta (a timing tolerance to allow for inexact synchronization to avoid overlapping bursts).

In some embodiments, the MPP maintains a free node ID that can be incremented after each assignment to guarantee uniqueness. When a node leaves the cluster its node ID is freed for reuse by a node that joins subsequently. In one embodiment, the MPP can reuse node IDs when a pair of mesh points are determined to be out of range of each other. This can be determined from scan lists, known topology (e.g., hop count separation), etc. Node ID assignment is described in greater detail below.

In one embodiment, when beacon collisions do occur, they can be resolved by, for example, having the client device with the lowest Media Access Control (MAC) address request a new node ID from the MPP. In some embodiments, the dwell time of the off-channel scan can be reduced by the Target Beacon Transmission Time (TBTT) Offset to ensure that all mesh nodes return to the home channel at the same time. Dwell time refers to the amount of time the node spends in the off-channel state (e.g., connected to the non-home channel). This could be a configurable feature, for example, because in some cases it may be undesirable to reduce dwell time.

By synchronizing the off-channel scanning events the resultant outage is minimized across the mesh cluster. Because all mesh nodes return to the home channel at approximately the same time, bandwidth and resources are not wasted transmitting to unreachable nodes. Thus, the coordination techniques described herein can provide a more efficient mesh environment in which users of client devices experience fewer network disruptions.

Figure 2:
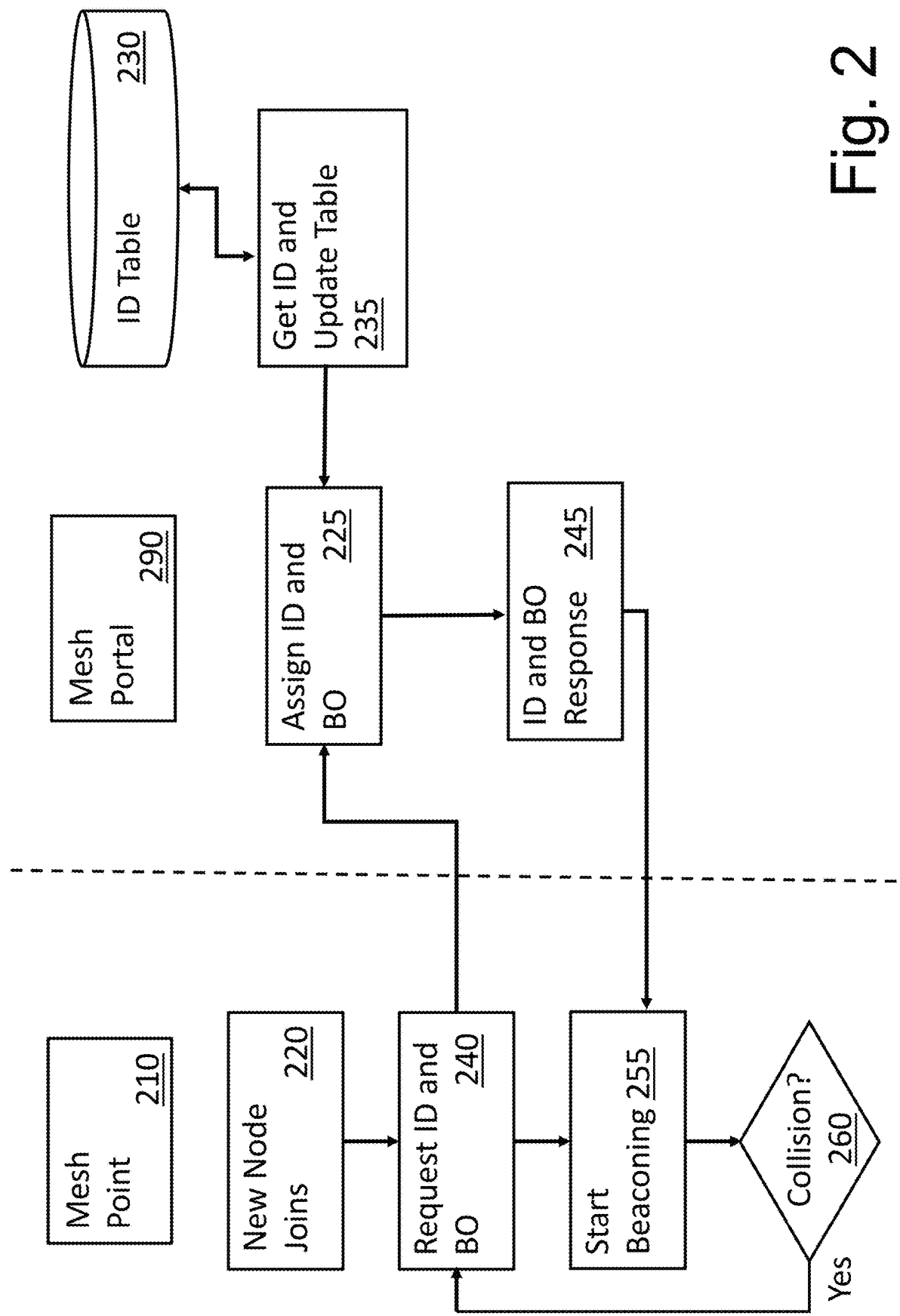
FIG. 2 is a flow diagram of one embodiment of a technique for node ID assignment.

FIG. 2 is a flow diagram of one embodiment of a technique for node ID assignment. In the example of FIG. 2, various operations are associated with specific nodes (e.g., MP 210 and MPP 290); however, in alternate embodiments, some of these operations can be performed by different nodes. In some embodiments, the functionality described with respect to FIG. 2 can be under the control of a mesh scan agent (e.g., 115 in FIG. 1).

In one embodiment, when a new node joins the cluster (e.g., 220) MP 210 can request a node ID and BO value from MPP 290. In one embodiment, MPP 290 utilizes ID table 230 to determine the available node ID for the new node (225). The next available node ID can be, for example, and incremented value with respect to the last assigned node Id. In some situations, the node ID can be a previously used node ID from a node that has left the mesh cluster or the node ID can be a unique node ID as determined by MPP 290. As discussed above, the BO value for the new node can be determined based on the node ID and the node burst time (225). Other BO value assignment techniques can also be supported.

In some embodiments, MPP 290 can retrieve an available node ID from ID table 230 and update (235) the contents of ID table 230. Mesh portal 290 can provide the ID and BO value to the new node (245) as part of the new node joining the mesh cluster and the new node can start beaconing (255).

If a collision occurs (260) a new ID and BO value can be requested (240) and the procedure can be repeated to obtain the new ID and BO value. This process can be repeated until no collisions occur. In some example embodiments, when a collision occurs, the mesh node with the higher hardware address can request a new node ID and BO value. If no collision occurs (260) the new node can continue operating. This process can be repeated for all new nodes to the mesh cluster. When a mesh node leaves the cluster the corresponding node ID can be released and potential reused for additional new nodes.

FIG. 3 is an example beacon timing diagram for a mesh cluster. The example of FIG. 3 conceptually illustrates timing relationships of various beacon offset values. In one embodiment, each node uses its assigned offset to burst its beacons before performing a scan. In the example of FIG. 3, the MPP (e.g., 110 in FIG. 1) can perform off-channel scan operations at time T0.

In the example of FIG. 3, MP1 refers to MPs that are one hop from the MPP. Thus, any number of MPs can be represented by MP1 in the timing diagram of FIG. 3. Similarly, MP2 refers to MPs that are two hops from the MPP, and MPN refers to MPs that are N hops from the MPP.

The MP1 nodes can perform off-channel scan operations at time T0+N (where N=B+D, is the node burst time) and the MP2 nodes can perform off-channel scan operations at time T0+2N. Off-channel scan operations can be performed in a similar manner for all mesh points with IDs and BO values being reused (e.g., MPN) when appropriate (as discussed in greater detail above).

In one embodiment, conceptually, the off-channel scanning ripples out from the MPP to the outermost MP. For example, the MPP can begin off-channel scanning first, followed by MPs that are one hop from the MPP, followed by MPs that are two hops from the MPP, etc. As discussed above, by synchronizing the off-channel scanning events the resultant outage is minimized across the mesh cluster. Because all mesh nodes return to the home channel at approximately the same time, bandwidth and resources are not wasted transmitting to unreachable nodes.

Figure 4:
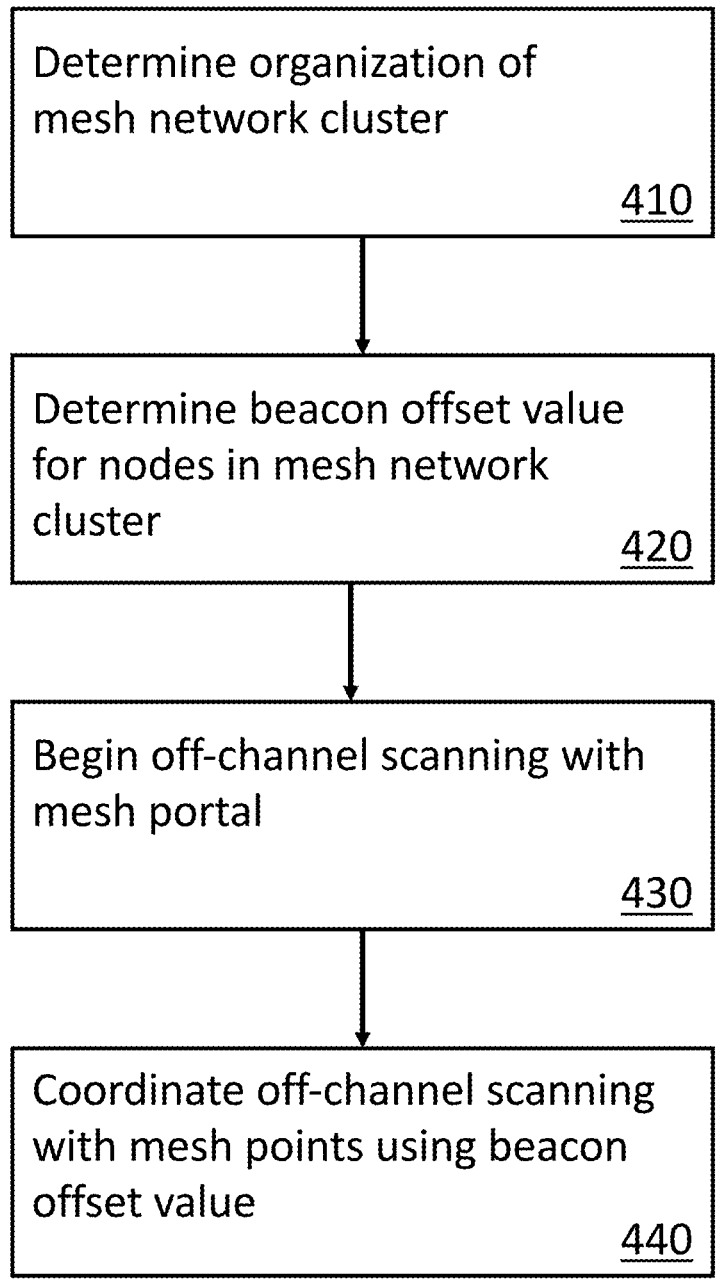
FIG. 4 is a flow diagram of one embodiment of a technique for coordinating off-channel scanning in a wireless mesh network.

FIG. 4 is a flow diagram of one embodiment of a technique for coordinating off-channel scanning in a wireless mesh network. The techniques of FIG. 4 can be managed/administered by, for example, the MPP (e.g., as described in FIG. 2).

The organization of the mesh cluster is determined, 410. In one embodiment, this includes determining a node ID and a beacon offset value for each node in the network. This can also include determining the number of hops between the mesh node and the MPP. As discussed above, node IDs and beacon offset values can be reused under certain conditions.

The beacon offset values are determined for nodes in the mesh cluster, 420. In one embodiment, the beacon offset value is determined by node identifier and node burst time. In some embodiments, to determine beacon offset value of a given mesh node, the mesh portal assigns a unique offset value to each mesh node in its cluster. As each mesh node joins the mesh network they register with the mesh portal which assigns a unique ID and the beacon offset value can be determined based on the unique ID. In one embodiment, the node burst time is the total time allocated for a node to burst all beacons with a tolerance based on hop count, which is the number of hops for the node to reach the mesh portal.

Off-channel scanning is started with the mesh portal, 430. As illustrated in FIG. 3, the mesh portal (MPP) can burst its beacon signals and begin off-channels scanning at time T0. As illustrated in FIG. 3, the mesh nodes can coordinate off-channel scanning using, for example, the beacon offset value, 440. In some embodiments, in order to allow all mesh nodes to return to the home channel at the same time, beacon offset values can be reused. For example, mesh nodes at eight hops from the mesh portal my reuse the same beacon offset value as mesh nodes at one hop from the mesh portal to that the mesh nodes at one hop and at eight hops can perform off-channel scanning at the same time. The point at which beacon offset values are reused can vary depending on cluster topology, beacon timing, dwell time of the off-channel scan, etc. Thus, other reuse configurations (e.g., at four hops, at 12 hops, at 9 hops) can be utilized.

Figure 5:
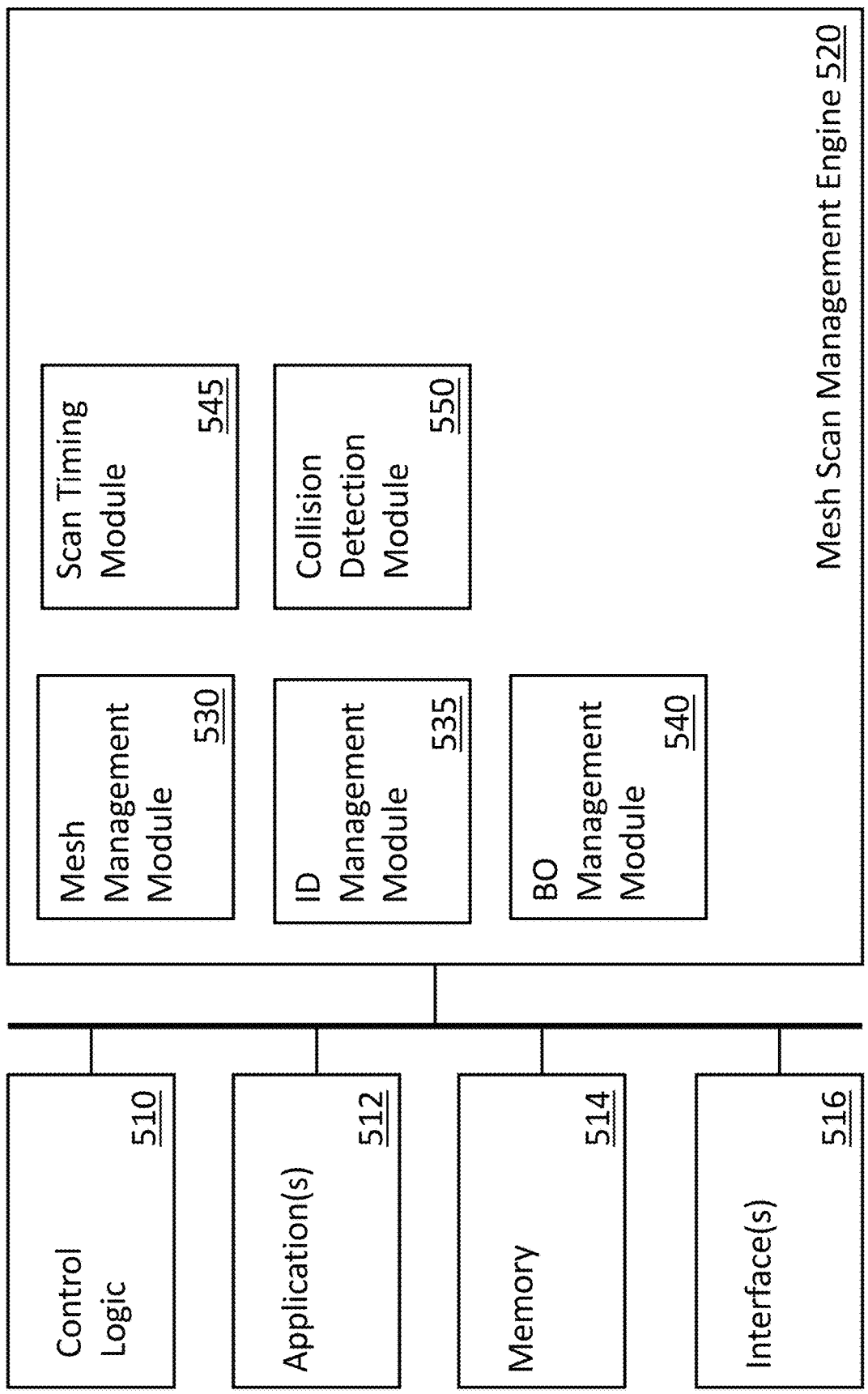
FIG. 5 is a block diagram of a mesh management system that can provide beacon management functionality as described herein.

FIG. 5 is a block diagram of a mesh management system that can provide beacon management functionality as described herein. In one embodiment, one or more mesh scan management agents may exist and/or operate within the host mesh cluster. The agent of FIG. 5 may provide functionality as described, for example, with respect to FIGS. 1-4. The agent of FIG. 5 may also provide additional functionality.

In one embodiment, mesh scan management agent 500 includes control logic 510, which implements logical functional control to direct operation of mesh scan management agent 500, and/or hardware associated with directing operation of mesh scan management agent 500. Logic may be hardware logic circuits and/or software routines. In one embodiment, mesh scan management agent 500 includes one or more applications 512, which represent a code sequence and/or programs that provide instructions to control logic 510.

Mesh scan management agent 500 includes memory 514, which represents a memory device and/or access to a memory resource for storing data and/or instructions. Memory 514 may include memory local to mesh scan management agent 500, as well as, or alternatively, including memory of the host system on which mesh scan management agent 500 resides. Mesh scan management agent 500 also includes one or more interfaces 516, which represent access interfaces to/from (an input/output interface) mesh scan management agent 500 with regard to entities (electronic or human) external to mesh scan management agent 500.

Mesh scan management agent 500 also includes mesh scan management engine 520, which represents one or more functions or module that enable mesh scan management agent 500 to provide the index backups as described above. The example of FIG. 5 provides several modules that may be included in mesh scan management engine 520; however, different and/or additional modules may also be included. Example modules that may be involved in providing buffer management functionality described herein include, for example, mesh management module 530, ID management module 535, BO management module 440, scan timing module 545 and collision detection module 550. As used herein, a module refers to routine, a subsystem, logic circuit, microcode, etc., whether implemented in hardware, software, firmware or some combination thereof.

In one embodiment, mesh management module 530 may operate to determine mesh cluster topology and/or perform other mesh cluster management functions. For example, mesh management module 530 can collect information gathered by mesh points during off-channel scan operations. In one embodiment, ID management module 535 operates to track node IDs and assign node IDs to new mesh nodes. ID management module 535 can also function to free unused node IDs from, for example, nodes that have left the mesh cluster.

In one embodiment, BO management module 540 operates to track node BO values and assign node BOs to new mesh nodes. Collision detection module 550 can operate to determine whether collisions occur and cause new node IDs and/or new BOs to be obtained.

In one embodiment, scan timing module 545 operates to manage the off-channel scan operations of the mesh nodes. For example, scan timing module 545 can function to cause the mesh node scanning to progressively stagger offsets from the mesh portal outwards across the mesh topology to avoid collisions and minimize the overall network outage by performing a synchronized scan across the mesh cluster, where each node uses its assigned offset to burst its beacons, before performing a scan.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium, having stored thereon instructions that, when executed by one or more hardware processors, are configurable to cause the one or more hardware processors to:
   determine an organization of a wireless mesh cluster having one or more mesh portals and one or more mesh points, wherein the one or more mesh portals each correspond with first access points (APs) that use a wired interface to reach a controller, and wherein the one or more mesh points each correspond with second APs that establish an all-wireless path to the one or more mesh portals;
   determine, for each of the one or more mesh points, a beacon offset value corresponding to each of the one or more mesh points; and
   coordinate off-channel scanning for each of the one or more mesh points utilizing the beacon offset value, wherein during the off-channel scanning, each of the one or more mesh points discontinues transmission on a home channel and scans at least one other channel.

2. The non-transitory computer-readable medium of claim 1, wherein the one or more mesh portals and the one or more mesh points return to the home channel at approximately the same time.

3. The non-transitory computer-readable medium of claim 2, wherein the one or more mesh portals announces a subsequent scan window by modifying a scan count in its beacon signal that is relayed through the wireless mesh cluster.

4. The non-transitory computer-readable medium of claim 1, wherein an off-channel dwell time for the one or more mesh points is configurable.

5. The non-transitory computer-readable medium of claim 1, wherein the beacon offset value is related to a number of hops between the one or more mesh portals and the one or more mesh points.

6. The non-transitory computer-readable medium of claim 1, wherein coordinating the off-channel scanning for each of the one or more mesh points utilizing the beacon offset value comprises coordinating the off-channel scanning for the wireless mesh cluster by coordinating the off-channel scanning for the one or more mesh portals and at least one mesh node.

7. The non-transitory computer-readable medium of claim 1, wherein coordinating the off-channel scanning for each of the one or more mesh points utilizing the beacon offset value comprises progressively staggering the off-channel scanning based on a number of hops from a mesh portal from the one or more mesh portals and radiating outward from the mesh portal.

8. A method comprising:
   determining an organization of a wireless mesh cluster having one or more mesh portals and one or more mesh points, wherein the one or more mesh portals each correspond with first access points (APs) that use a wired interface to reach a controller, and wherein the one or more mesh points each correspond with second APs that establish an all-wireless path to the one or more mesh portals;
   determining, for each of the one or more mesh points, a beacon offset value corresponding to each of the one or more mesh points; and
   coordinating off-channel scanning for each of the one or more mesh points utilizing the beacon offset value, wherein during the off-channel scanning, each of the one or more mesh points discontinues transmission on a home channel and scans at least one other channel.

9. The method of claim 8, wherein the one or more mesh portals and the one or more mesh points return to the home channel at approximately the same time.

10. The method of claim 8, wherein an off-channel dwell time for the one or more mesh points is configurable.

11. The method of claim 8, wherein the beacon offset value is related to a number of hops between the one or more mesh portals and the one or more mesh points.

12. The method of claim 8, wherein coordinating the off-channel scanning for each of the one or more mesh points utilizing the beacon offset value comprises coordinating the off-channel scanning for the wireless mesh cluster by coordinating the off-channel scanning for the one or more mesh portals and at least one mesh node.

13. The method of claim 8, wherein coordinating the off-channel scanning for each of the one or more mesh points utilizing the beacon offset value comprises progressively staggering the off-channel scanning based on a number of hops from a mesh portal from the one or more mesh portals and radiating outward from the mesh portal.

14. A wireless mesh network comprising:
   a wireless mesh portal; and
   a plurality of wireless mesh points, wherein each mesh point of the plurality of wireless mesh points are located within an architecture of the wireless mesh network and provide network access to one or more wireless client devices, wherein the plurality of wireless mesh points configured to communicate with the wireless mesh portal over a home channel, and wherein the plurality of wireless mesh points configurable to:
      determine an organization of a wireless mesh cluster having the wireless mesh portal and the plurality of wireless mesh points, wherein the wireless mesh portal corresponds with a first access point that use a wired interface to reach a controller, and wherein the plurality of wireless mesh points each correspond with second APs that establish an all-wireless path to the wireless mesh portal;
      determine, for each mesh point of the plurality of wireless mesh points, a beacon offset value corresponding to each mesh point of the plurality of wireless mesh points; and coordinate off-channel scanning for the plurality of wireless mesh points utilizing the beacon offset value, wherein during the off-channel scanning, each mesh point of the plurality of mesh points discontinues transmission on the home channel and scans at least one other channel.

15. The wireless mesh network of claim 14, wherein the wireless mesh portal and the plurality of wireless mesh points return to the home channel at approximately the same time.

16. The wireless mesh network of claim 15, wherein the wireless mesh portal announces a subsequent scan window by modifying a scan count in its beacon signal that is relayed through the wireless mesh cluster.

17. The wireless mesh network of claim 14, wherein off-channel dwell time for the plurality of wireless mesh points is configurable.

18. The wireless mesh network of claim 14, wherein the beacon offset value is related to a number of hops between the wireless mesh portal and the plurality of wireless mesh points.

19. The wireless mesh network of claim 14, wherein coordinating the off-channel scanning for the plurality of wireless mesh points utilizing the beacon offset value comprises coordinating the off-channel scanning for the wireless mesh cluster by coordinating the off-channel scanning for the wireless mesh portal and at least one mesh node.

20. The wireless mesh network of claim 14, wherein coordinating the off-channel scanning for the plurality of wireless mesh points utilizing the beacon offset value comprises progressively staggering the off-channel scanning based on number of hops from the wireless mesh portal and radiating outward from the wireless mesh portal.

\* \* \* \* \*